United States Patent
Krishnamurthy et al.

(10) Patent No.: US 9,173,241 B2
(45) Date of Patent: Oct. 27, 2015

(54) RADIO-LINK ESTABLISHMENT FOR MULTI-STATE CELLS

(71) Applicant: MOTOROLA MOBILITY LLC, Chicago, IL (US)

(72) Inventors: Sandeep H. Krishnamurthy, Mountain View, CA (US); Ravi Kuchibhotla, Gurnee, IL (US); Ajit Nimbalker, Buffalo Grove, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/218,070

(22) Filed: Mar. 18, 2014

(65) Prior Publication Data

US 2015/0126206 A1    May 7, 2015

Related U.S. Application Data

(60) Provisional application No. 61/901,085, filed on Nov. 7, 2013.

(51) Int. Cl.
  *H04W 72/00* (2009.01)
  *H04W 76/02* (2009.01)
  (Continued)

(52) U.S. Cl.
  CPC ........... *H04W 76/027* (2013.01); *H04L 5/0048* (2013.01); *H04W 48/16* (2013.01); *H04W 56/00* (2013.01); *H04W 56/001* (2013.01); *H04W 72/04* (2013.01)

(58) Field of Classification Search
  CPC . H04W 52/0206; H04W 48/16; H04W 48/08; H04W 84/045; H04W 24/02; H04W 24/10; H04W 36/0061; H04W 48/12; H04W 52/0216; H04W 76/048; H04W 48/10; H04W 52/0219; H04W 52/0274; H04W 56/001
  USPC ....................................................... 455/452.1
  See application file for complete search history.

(56) References Cited

U.S. PATENT DOCUMENTS 8,644,815  B2    2/2014  Ishii et al.
2011/0021154  A1 *  1/2011  Marinier et al. ........... 455/67.11
(Continued)

FOREIGN PATENT DOCUMENTS

| EP | 2416608 A1 | 8/2012 |
|---|---|---|
| WO | 2013028128 A1 | 2/2013 |
| WO | 2013137788 A1 | 9/2013 |

OTHER PUBLICATIONS

RAN1 Chairman's Notes, 3GPP TSG RAN WG1 Meeting #74, Guangzhou, China, Oct. 7-11, 2013, all pages.
(Continued)

*Primary Examiner* — Kwasi Karikari
(74) *Attorney, Agent, or Firm* — Lerner, David, Littenberg, Krumholz & Mentlik, LLP

(57) ABSTRACT

A radio link is established for multi-state cells. User equipment is operated in a connected mode with a serving cell. A transition is determined of a neighbor cell from dormant to active. At least a set number of out-of-synchronization events are detected with respect to the serving cell. It is determined that the neighbor-cell reference-signal received power is greater than the serving-cell reference-signal received power plus a threshold after determining the transition of the neighbor cell from dormant to active. A radio-resource-control connection-establishment message is sent to the neighbor cell when the neighbor-cell reference-signal received power is greater than the serving-cell reference-signal received power plus a threshold.

3 Claims, 4 Drawing Sheets

(51) Int. Cl.
*H04W 72/04* (2009.01)
*H04L 5/00* (2006.01)
*H04W 56/00* (2009.01)
*H04W 48/16* (2009.01)

(56) References Cited

U.S. PATENT DOCUMENTS

2011/0124340 A1    5/2011   Puttonen et al.
2011/0211458 A1    9/2011   Ishii et al.
2012/0002554 A1*   1/2012   Ishii et al. .................... 370/242
2012/0015657 A1*   1/2012   Comsa et al. ................ 455/436
2012/0115468 A1*   5/2012   Lindoff et al. ............... 455/434
2013/0183974 A1*   7/2013   Johansson et al. ........... 455/436
2013/0294307 A1*  11/2013   Johansson et al. ........... 370/311
2014/0362750 A1*  12/2014   Song et al. ................... 370/311

OTHER PUBLICATIONS

QUALCOMM Incorporated: "RLF recovery enhancements", 3GPP TSG-RAN WG2 Meeting #81bis, R2-130933, Chicago, USA, Apr. 15-19, 2013, all pages.

Huawei et al., 'Discovery signals for energy-efficient small cell discovery', R1-134766, 3GPP TSG RAN WG1 meeting #74bis, Guangzhou, China, Oct. 7-11, 2013.

International Search Report and Written Opinion for Application No. PCT/US2014/064089 dated Feb. 16, 2015.

* cited by examiner

RADIO-LINK ESTABLISHMENT FOR MULTI-STATE CELLS

CROSS-REFERENCE TO RELATED APPLICATIONS

The present application claims priority to U.S. Provisional Patent Application 61/901,085, filed on Nov. 7, 2013, and incorporated herein by reference in its entirety.

TECHNICAL FIELD

The present disclosure is related generally to radio-link establishment for multi-state cells.

BACKGROUND

Presently, wireless networks, such as Long Term Evolution ("LTE") and LTE-Advanced ("LTE-A") networks, may be heterogeneous networks that include macro cells that provide higher power and wider area coverage and small cells that provide lower power and smaller area coverage than the macro cells. Such wireless networks can also include High-Speed Downlink Packet Access+ ("HSDPA+") networks, Wideband Code Division Multiple Access ("WCDMA") networks, CDMA2000 Evolution Voice-Data Optimized ("1xEV-DO") networks, and other wireless networks.

The small cells can be located within or outside a macro-cell coverage area. The small cells may be provided to offer additional capacity, such as to handle more user equipment, and may be provided to offer additional coverage, such as to fill in coverage holes or gaps in a macro-cell-coverage area. Small cells include micro cells that provide coverage of up to approximately 2 kilometers, such as for large train stations and airports that also may require additional capacity beyond the capacity of a co-located macro cell and for temporary additional network capacity, such as at sporting events and festivals and during emergency situations. Small cells also include pico cells that provide coverage of up to approximately 200 meters, such as for airports, event venues, train stations, stock exchanges, shopping malls, and large office areas. Small cells additionally include femto cells that provide coverage of up to approximately 10 meters, such as for homes and small office areas. Small cells can further include other cells that provide less coverage than a macro cell. A base station, such as an evolved Node B ("eNB"), can be associated with each cell type to provide network access to wireless mobile devices, such as user equipment, passing through the associated cell-coverage area.

The macro cells and the small cells can be multi-state cells in that they can have an active mode and a dormant mode. A neighbor cell is a cell in a power-saving mode and can also be considered an off cell or in a sleep mode. An active cell is a cell in an operational mode and can also be considered an on cell or in an awake mode.

As user equipment travels through small cell-coverage areas, cell handovers may be required. Handover is used to keep user equipment connected to the best base station ("eNodeB"). Handover is usually based on downlink received-signal strength and carrier-to-interference ratio measurements. Processing of the handover measurement is usually done in Layer 1 and Layer 3 ("L3") by the user equipment, and handover is initiated by the serving eNodeB if certain event criteria are met.

Unfortunately, handovers in the presence of active and dormant cells result in network-system and user-equipment inefficiencies and other problems. These problems include increased detection and reporting of serving-cell channel quality, increased user-equipment power consumption, and excessive handover between cells with an increased risk of radio-link failure. For example, a user equipment cannot engage in efficient radio-link monitoring for a dual-state cell that is in a dormant state.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
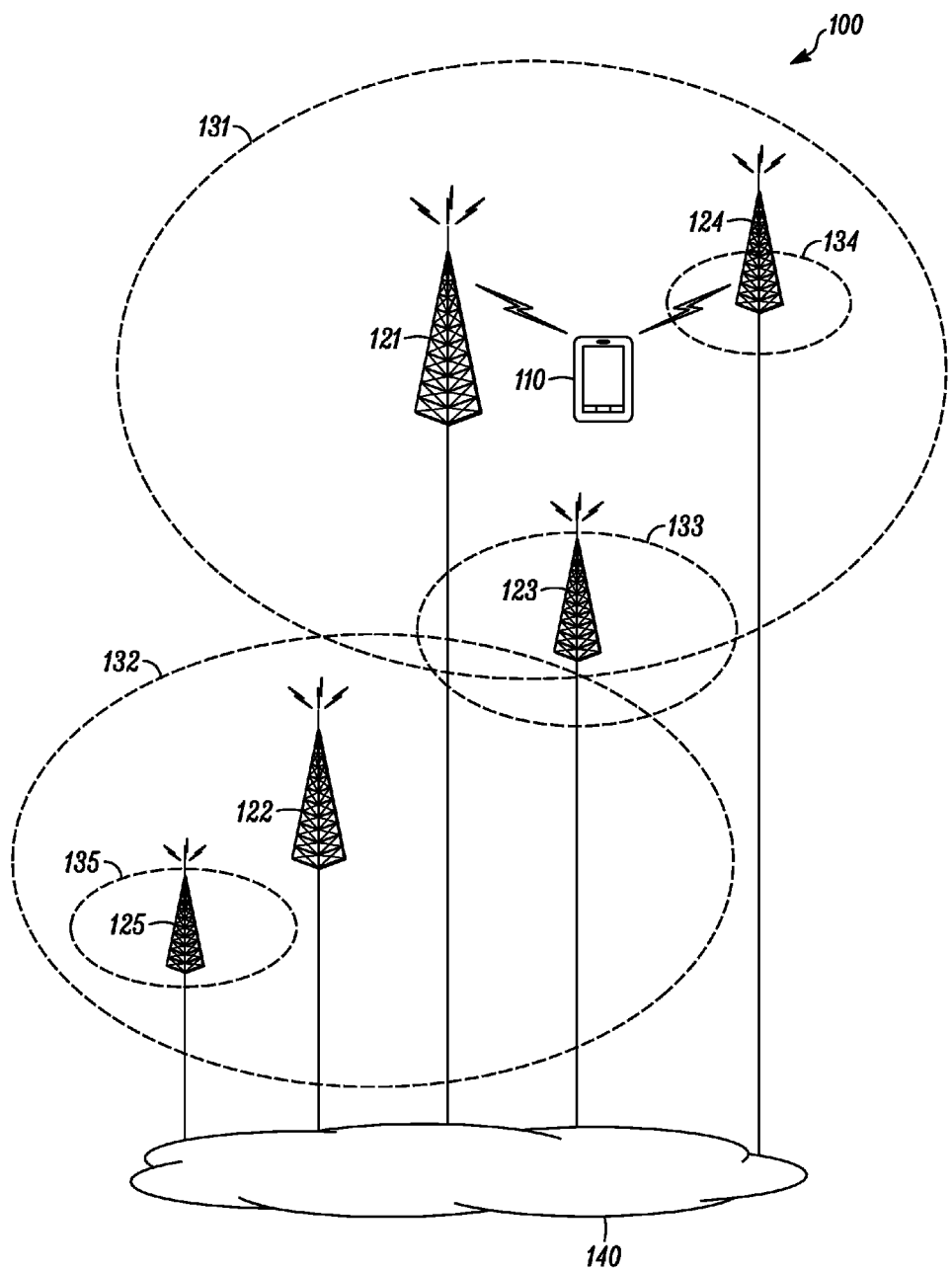
FIG. 1 is a diagram of an exemplary system according to a possible embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

FIG. 1 is an exemplary diagram of a system 100 according to a possible embodiment. The system 100 includes user equipment 110, base stations 121 through 25, and a network 140. The base stations 121 and 122 provide coverage for macro cells 131 and 132, respectively. The base stations 123 through 125 provide coverage for small cells 133 through 135, respectively. In the following description, the terms cell and base station may be used interchangeably. The user equipment 110 can be a wireless telephone, a cellular telephone, a personal digital assistant, a smartphone, a pager, a personal computer, a selective call receiver, a tablet computer, a user portable wireless network communication device, or any other device that is capable of sending and receiving communication signals on a network such as a wireless network. The base stations 121-125 may be macro-cell base stations, cellular base stations, enhanced NodeBs, small-cell base stations, home base stations, wireless local area network access points, or any other devices that provide access between a wireless device and a network. The base stations 121-125 can communicate with the user equipment 110 using network transmission signals and other wireless transmission signals.

The network 140 may include any type of network that is capable of sending and receiving signals, such as wireless signals. For example, the network 140 may include a wireless communication network, a cellular telephone network, a Radio Access Network ("RAN"), a Public Land Mobile Network ("PLMN"), a Time Division Multiple Access-based network, a Code Division Multiple Access-based network, a WCDMA network, an Orthogonal Frequency Division Multiple Access-based network, an LTE network, an LTE-A network, a 3rd Generation Partnership Project ("3GPP")-based network, an HSDPA+ network, a 1xEV-DO network, a satellite communications network, a packet-based data network, the Internet, an intranet, a wireless wide area network, a wireless local area network, and other communications systems. The network 140 may also include more than one network and may include a plurality of different types of networks, such as data and telecommunication networks.

In operation, the user equipment 110 operates in a connected mode with a serving cell, such as when connected to one of the base stations 121-125. In some embodiments, the user equipment 110 determines a transition of a neighbor cell, such as a transition of another of the base stations 121-125, from dormant to active. The user equipment 110 detects at least a set number of out-of-synchronization events with respect to the serving cell. The user equipment 110 determines that the neighbor-cell reference-signal received power is greater than the serving-cell reference-signal received power plus a threshold after determining the transition of the neighbor cell from dormant to active. The user equipment 110 then sends a radio-resource-control connection-establishment message to the neighbor cell when the neighbor-cell reference-signal received power is greater than the serving-cell reference-signal received power plus a threshold.

The cell can transmit a discovery signal. In the dormant state, the periodicity of periodic non-user equipment specific transmissions, such as synchronization signals, transmissions related to system information, and other transmissions, from the cell may be longer, such as "1 ms every 100 ms" or "5 ms every 1 s," than the periodicity of such transmissions in the active state, such as "1 ms every 5 ms" or "multiple symbols in every 1 ms subframe." Operating a cell in a dormant state may not only help in reducing energy consumption of the cell but can also help in reducing overall network interference. The dormant and active states can be implemented in several ways.

According to an example implementation, a cell can periodically transmit a pilot/reference/synchronization signal, which can be referred to as a discovery signal, when operating in dormant state. The cell may also periodically transmit a longer periodicity physical broadcast channel, such as a discovery channel, that is associated with the discovery signal when the cell is in a dormant state. The discovery signal and channel transmissions may be the only periodic non-user equipment specific transmissions made by the cell in dormant state.

When the cell is in an active state, it can transmit additional synchronization signals and broadcast channels with a shorter periodicity when compared to the dormant state. For example, when the cell is in an active state, it can transmit all the synchronization signals and broadcast channels required to support user equipment that are compliant with network specifications. According to LTE specifications, such transmissions can include a Primary Synchronization Signal ("PSS") in slots 0 and 10 of every radio frame, which has ten 1 ms subframes, each subframe having two slots of 0.5 ms duration each; a Secondary Synchronization Signal ("SSS") in slots 0 and 10 of every radio frame; a Physical Broadcast CHannel ("P-BCH") carrying a Master Information Block ("MIB") in slot 1 of every radio frame in active state; a Physical Downlink Shared CHannel ("PDSCH") carrying System Information Block 1 ("SIB1") information in every alternate radio frame and an associated Physical Downlink Control CHannel ("PDCCH") to indicate the PDSCH Resource Blocks ("RBs"); a PDSCH carrying other System Information Block ("SIBs") in a plurality of radio frames conformant with the System Information ("SI") scheduling mechanisms and an associated PDCCH to indicate the PDSCH RBs; Common Reference Signals ("CRS") in every slot of every radio frame except for the second slot in an Multicast-Broadcast Single-Frequency Network subframe; and other transmissions. Such transmissions can also include transmissions useful for other network types. Based on the above list, the cell in an active state may have at least one transmission in every slot, such as with a periodicity of once every 0.5 ms or may have other transmission periodicities depending on different network requirements.

In addition to the transmissions in the above list, the cell can also transmit a discovery signal when in an active state. If the discovery signal has a structure that is detectible in fewer slots than the slots required for detecting PSS/SSS, then the transmission of the discovery signal in the active state can help in reducing the measurement burden of user equipment making inter-frequency measurements on the cell transmitting the discovery signal. For example, a first cell can transmit a discovery signal on a carrier with center frequency F1, and with a periodicity of once every 150 ms. A user equipment connected to a second cell operating on a carrier with center frequency F2 can attempt to detect the first cell by either attempting to detect PSS/SSS or by detecting the discovery signal from the first cell.

According to another example implementation, the active-state transmissions made by the cell are similar to the active-state transmissions described above, and the cell in the dormant state may transmit other reference signals and channels in addition to the discovery signal. For example, the dormant-state transmissions by the cell can include reduced-Cell-Specific Reference Signal ("CRS") transmissions, such as transmission of a pilot sequence in the 5th subframe of every radio frame on Resource Elements corresponding to a CRS antenna port; broadcast channel transmissions that are associated with Demodulation Reference Signals ("DMRS") instead of CRS; control channel transmissions, such as a common search space for Enhanced Physical Downlink Control Channel ("EPDCCH") transmissions; and other transmissions. Such transmissions can be used by advanced user equipment, such as user equipment supporting future releases of LTE specifications for connecting to and communicating with a cell even when the cell is in a dormant state.

Some systems use a combination of the above implementations, such as when they support three states. The three states can include an active state, a semi-dormant state, and a dormant state. Embodiments may classify the semi-dormant state as an active state, a dormant state, or a separate state depending on the desired outcome of radio-link establishment.

In addition to the periodic non-user equipment specific transmissions above, a cell can also support event-triggered transmissions, such as paging indications when a paging message is received from a PLMN associated with the cell; Random Access Channel ("RACH") response transmissions, such as when a RACH is received from a user equipment camped or connected to the cell; and other event-triggered transmissions. In some implementations, such transmissions can be supported by the cell in both the dormant and active states. In other implementations, the cell may switch from dormant to active in response to such events and can make the related transmissions while active. In other implementations, the cell may stay dormant for some events and switch to active for other events. For example, a cell can transmit a paging indication while dormant, wait for a RACH transmission in response to the paging indication, and, after receiving the RACH transmission, switch to the active state to transmit a RACH response.

For an active cell in a single-state cell system, when a user equipment is switched on, a PLMN is selected by Non-Access Stratum ("NAS") procedures implemented in the user equipment. For the selected PLMN, the user equipment may also set associated Radio Access Technologies ("RATs"), such as LTE and other RATs. During cell selection, the user equipment can search for a suitable cell of the selected PLMN and can choose that cell to provide available services. Further, the user equipment can tune to its control channel. In LTE Rel8/9/10/11, this process can be implemented by the user equipment monitoring at least the PDCCH of the selected cell. The choosing of a cell can also be referred to as camping on the cell or operating on a cell. The user equipment can, if necessary, then register its presence in the tracking area of the chosen cell by means of a NAS registration procedure. If the user equipment finds a more suitable cell, it can reselect onto that cell and camp on it according to a given cell reselection criteria. Once the user equipment is camped on a cell it can receive SI related to its PLMN from that cell. In LTE Rel8/9/10/11, the SI is received in a MIB via a Physical Broadcast CHannel ("PBCH") and multiple SIBs via PDCCH and PDSCH. The user equipment can also request communication resources from that cell by first transmitting an RACH message and sending other higher layer messages such as a Radio-Resource Control ("RRC") connection request. Also, if the PLMN receives a call for the registered user equipment, it can know the set of tracking areas in which the user equipment is camped and it can then send a paging message for the user equipment using PDCCH and PDSCH of all the cells in the set of tracking areas. The user equipment can receive the paging message and respond to the message because the user equipment monitors the PDCCH of at least one cell in one of the registered tracking areas in certain subframes, such as the paging occasions indicated in the system information received from the cell.

In a system that supports dormant- and active-state cells, if the user equipment camps on a cell in an active state, it can follow LTE Rel8/9/10/11 idle-mode procedures for receiving system information and monitoring PDCCH for paging indications. If the user equipment detects a dormant cell, according to an example possible implementation, the dormant cell may transmit only occasionally, and the user equipment may only camp on cells that are active. The user equipment can determine the active vs. dormant status of a cell from the cell's discovery-signal transmission, such as a Small-Cell Discovery Signal ("SCDS") for a small cell, its identifier, such as a Small Cell Identifier ("SCID") for a small cell, or a longer periodicity broadcast channel, such as a Dormant-PBCH transmitted along with the discovery signal. If the cell is dormant, one option for the user equipment is to reselect to a different cell that is active. Another option is to initiate a cell wake-up procedure that requests the cell to transition from dormant to active, and the user equipment can camp on the cell after detecting that the cell has transitioned to active. The basic principle of the cell wake-up procedure can include the user equipment transmitting a signal, such as a wake-up signal, in a set of time-frequency resources that are known a priori to the cell. The cell can monitor those time-frequency resources, and if it is able to detect the wake-up signal transmitted by the user equipment, the cell can transition from dormant to active.

According to one example of waking up a dormant cell, the user equipment can transmit a RACH preamble sequence as a wake-up signal, such as with one of pre-specified formats described in LTE Rel8/9/10/11 specification, or formats described for other RANs, such as HSDPA+, WCDMA, CDMA2000, 1xEV-DO, and other networks that have dormant and active cells. The user equipment can transmit the RACH preamble in a subframe and a set of RBs on an uplink carrier. The user equipment may determine a set of RBs and an Evolved Universal Terrestrial Radio Access ("EUTRA") Absolute Radio Frequency Channel Number ("EARFCN") of the uplink carrier from SCID/discovery signal/Dormant-PBCH. The subframe in which the user equipment transmits the RACH can have a fixed timing offset from the subframe in which it detects the discovery signal. As one alternate, if a Dormant-PBCH is received by the user equipment, a subframe offset can be included in that message. For example, if the user equipment detects a discovery signal in subframe p, it can transmit RACH in subframe p+W where W is the subframe offset. After transmitting the wake-up signal, the user equipment can continue monitoring the discovery signal of the cell. If the user equipment determines a transition from dormant to active state based on a change in discovery signal/SCID/Dormant P-BCH, then the user equipment can proceed to download system information from the cell and start monitoring PDCCH/EPDCCH of the cell for paging indications. The user equipment can also optionally implement a time-out mechanism where it can start a timer after transmitting the wake-up signal. If the timer expires before the user equipment detects a transition from active to dormant state, such as after 2 seconds, 5 s, 6 s, or other useful time, it can re-transmit the wake-up signal. If the user equipment is unable to detect a transition from active to dormant state after multiple transmissions of wake-up signal, such as after 2, 5, 6, or other number of transmissions, it can proceed to reselect to another cell.

The cell also can implement a time-out procedure to transition from an active to a dormant state. For example, when a cell is initially dormant, it may receive a wake-up signal from a user equipment, can transition to active, and can start a timer during the transition. If the cell determines that no user equipment are connected to it, such as if it has not configured any user equipment in RRC Connected state for a predefined time period, the cell can switch from active to dormant. Any user equipment that are camped on that cell and are not connected to that cell can reselect to a different cell or initiate a wake-up procedure to transition the cell from dormant to active.

According to another example possible implementation, if the user equipment detects a dormant cell, the dormant cell can support some or all of the procedures used to service idle-mode user equipment. In one embodiment of this implementation, if the cell is dormant, then the user equipment can determine, from a cell-discovery signal and a broadcast channel ("D-PBCH") that is transmitted along with the discovery signal, some or all of the following information: whether the system information transmitted by the cell has changed from a previous setting, such as by using a value tag transmitted in D-PBCH; wake-up signal parameters; a RACH preamble sequence index; an uplink ("UL") EUTRA EARFCN of an uplink carrier where the user equipment can transmit RACH; a subframe offset for RACH transmission; a RB offset for RACH transmission; dormant state paging parameters; and a subframe offset for monitoring paging indication in dormant mode. If the user equipment has not previously received system information from a cell, and if it detects the cell while the cell is dormant, then the user equipment can initiate the cell wake-up procedure to transition the cell from dormant to active; can download the system information, such as MIB and SIB1 through SIB11 described in 3GPP LTE specifications, from the cell; and can store a value tag, such as an integer with range 0 to 31, associated with the downloaded SI. The user equipment then can determine the paging occasions and paging frames corresponding to its User Equipment Identifier from the downloaded SI; can monitor PDCCH/EPD-CCH for Downlink Control Information ("DCI") with Cyclic Redundancy Check ("CRC") scrambled by Paging Radio Network Temporary Identifier in the paging occasions; and can continue monitoring the cell-discovery signal and D-PBCH for any change in SI or cell state. If the cell switches to dormant, the user equipment may not re-initiate the wake-up procedure to move the cell to active. Instead, it may continue monitoring the cell-discovery signal and D-PBCH as long as the SI of the cell is unchanged, such as long as the value tag received in D-PBCH matches the value tag stored when the user equipment previously received SIB1, where the value tag can be an integer in the range 0 to 31.

The user equipment can use this approach in scenarios where the user equipment leaves and re-enters a coverage area of a cell. The user equipment can download and store SI from a cell. It can then leave and later re-enter the coverage area of the cell. If the cell is dormant when the user equipment re-enters, and if the value tag of the SI associated with the cell is transmitted along with a cell-discovery signal, then the user equipment need not wake up the cell to again download SI or check its validity. Instead, the user equipment can simply use the value tag transmitted in dormant mode to determine the validity of its previously stored SI.

While the cell is dormant from the perspective of the user equipment, and the user equipment is camped on the cell in RRC Idle mode, the user equipment can follow the same procedures as specified in LTE Rel8/9/10/11 or other RAN specifications when any of the following events occur: the user equipment detects that SI has changed, such as from a value tag on D-PBCH or via a paging message indicating an SI change; the user equipment detects a paging message in its paging occasion; or the user equipment has UL data to transmit and has to send a connection request. The cell, however, may switch from dormant to active whenever there is an SI change, whenever it receives a page message for a user equipment which belongs to the same tracking area as the cell, or whenever it receives a wake-up signal or RACH from a user equipment camped on the cell.

According to a possible implementation of Radio-Link Monitoring ("RLM"), a user equipment in RRC Connected mode can monitor the downlink radio-link quality of its serving cell as part of the radio-link monitoring procedure for the purpose of indicating radio problem detection status or radio-link quality to higher layers. The radio problem detection may be based on cell-specific reference signals or other reference signals, such as Channel State Information-RS. In non-Discontinuous Reception ("non-DRX") mode operations, such as when the user equipment is not in sleep mode, the user equipment can check the radio-link quality in every radio frame, measured over a time period, against thresholds, such as Qout and Qin, defined implicitly by relevant requirements for detecting out-of-sync ("OOS") and in-sync ("IS") conditions, where "sync" is synchronization. For example, the Qout can be detected if the user equipment estimates that a hypothetical control channel Block Error Rate ("BLER") exceeds a first threshold value. For every radio frame, the user equipment can indicate radio-problem detection to higher layers when the quality is worse than the threshold Qout and can continue radio-link monitoring until the quality gets better than the threshold Qin, until a radio-link failure ("RLF") is declared, such as after a certain timer expires, or other useful condition, and the user equipment can then initiate a radio-link recovery procedure. A user equipment experiencing radio-link quality issues with one serving cell, such as an eNB, enhanced Base Station, or other serving cell, may be handed over to another serving cell, such as based on measurements provided by the user equipment to the eNB or network-aided measurements. However, for cases such as where a user equipment is in a connected state to a serving cell, but the user equipment suddenly experiences severe sustained quality degradation and cannot receive any messages from the serving cell, radio-link failure can occur and a radio-link recovery procedure can be used.

Qout detection may also be referred as an OOS condition. Qin can be detected if the user equipment estimates that a hypothetical control channel BLER is below a second threshold value. Qin detection may be referred as an IS condition. The indications of these conditions can be used by a higher layer, such as the RRC layer or Layer 3, to trigger a radio-link monitoring procedure. According to one example implementation, if Layer 3 receives a number of OOS indications, such as based on a N310 counter, a T310 timer can be started. If no IS indications are received before the T310 timer expires, then the Layer 3 can declare an RLF and can suspend uplink transmissions. As an alternate example implementation, if Layer 3 receives a number of IS indications, such as based on an N311 counter, before the T310 timer expires, the Layer 3 can declare a Radio-Link Recovery ("RLR"), and the user equipment can resume normal operation. For example, a N311 parameter can indicate the number of 100 ms intervals that the user equipment must successfully decode the PDCCH or EPDCCH to be back in-synch with the eNodeB and stop the T310 timer. The value of the timers and counters may vary based on the RLM technique used by the user equipment.

According to a possible example, a cell, such as a small cell or a macro cell, may not be woken up when in an off state, such as a dormant cell, to support idle-mode mobility unless legacy reselection rules cannot find a suitable active cell to camp on.

For example, when there are only small cells available to a user equipment with no underlying macro layer, if the user equipment can no longer be camped on the current serving cell and only a small cell in an off state is available and it belongs to a different tracking area, then the user equipment has reached the edge of the paging area and the RAN can extend the paging area. The user equipment can RACH and send a RRC message indicating the signal power and the Physical Cell ID of the small cell in the off state, which is a potential reselection candidate. Alternatively, the RAN can execute a connected-mode handover of the user equipment.

According to a possible implementation, if a legacy frequency layer in which no cell goes to off state is unavailable and if a small cell is in an on state, a user equipment camps on it, and the small cell goes to an off state, the user equipment can continue camping on that cell. Otherwise, all idle user equipment camped on the cell may reselect after the on to off transition. In this implementation, the small cell in the off state can page user equipment camped on it.

One possible option for Paging Occasions ("POs") in this implementation can use POs that are the same as legacy, such as Rel-11 POs.

Another possible option for POs in this implementation can use differently defined POs, such as POs that are not backwards compatible with Rel-8/9/10/11. For example, the POs can be aligned with an SCDS. As a further example, a paging subframe for a small cell in an off state can immediately follow or precede a SCDS, and the periodicity can be n*TSCDS, where n=2, 4, 8, 16, etc., such as when TSCDS=160 ms, n=2, 4, 8, 16 lead to the legacy idle-mode DRX cycle periods of 320 ms, 640 ms, 1.28 s and 2.56. If the tracking or paging area is large when POs are legacy POs, such as when the paging area is the same as all small cells within a macro cell, such as 1000 user equipment in idle mode within the macro footprint and the user equipment arrival rate is large, such as lambda=4 per second, then each small cell may page all user equipment within the paging area and, as a result, each small cell may end up waking up 2*lambda ("=8") times per second. In this situation, the new POs, such as differently defined POs, may be used instead of legacy POs to reduce the frequency of transitioning a cell from off to on.

According to a possible implementation, if a legacy frequency layer is available, a RAN can bar cells that plan to go off from camping even when those cells are active. Alternatively, if the RAN prefers not to have user equipment consider small cells in off state as reselection candidates unless the serving cell's Reference-Signal Received Power ("RSRP") has degraded much below serviceable levels, it can either configure different, such as larger, Qoffset values for dormant cells as compared to active cells or completely exclude dormant small cells from reselection evaluation. For example, when a macro cell is on frequency F1, and small cells are on a separate frequency F2 with outdoor or indoor small cells, the user equipment may reselect to a dormant small cell by sending a RACH on special occasions and waking it up, but the RAN may want the user equipment to wake a dormant cell up only when there is no other suitable cell to reselect to and different Qoffset values can be used.

According to a possible implementation of connected-mode RLM, the user equipment can have two sets of k-coefficients for a L3 filter, such as described in RRC specification 36.331, Time To Trigger ("TTT") conditions for handover, and hysteresis. One set, such as k1, TTT1, Hys1, and Off1, can be used for macro cells and small cells in the on state. A second set, such as k2, TTT2, Hys2, and Off2, can be used for small cells in the off state. For a cell in an off state, the user equipment can perform RSRP/Reference-Signal Received Quality ("RSRQ") based on the signal transmitted by the cell in the off state, which can be an SCDS or other discovery signal. A stronger L3 filter with k2>k1 can be chosen to address larger error variance for off cell RSRP/RSRQ measurement and similarly, for TTT and hysteresis.

According to a first possible example embodiment of the connected-mode RLM, if a user equipment was connected to a macro or small serving cell and a neighbor cell, such as a neighbor small cell or macro cell, transitioned to an off state, the neighbor cell may have been servicing a low load and therefore there may be no sudden change in interference characteristics with respect to the user equipment. The Channel Quality Indicator ("CQI") measurements with a sufficiently low time constant for interference measurements can take the reduced interference into account for subsequent measurements. The L3 filter can also be reset, such as if a large k2 value is used. The L3 filter reset can be triggered by a network RRC signal, such as a reconfiguration of a measurement object. The L3 filter reset can also be triggered at a transition when the user equipment starts measuring a SCDS, a Reduced Density Cell-Specific Reference Signal ("R-CRS"), a Channel State Information Reference Signal ("CSI-RS"), or other reference signal, such as transmitted by the neighbor cell in a dormant mode instead of a Cell-Specific Reference Signal ("CRS"), such as transmitted by the neighbor cell in an active mode. According to a possible example, R-CRS can refer to a CRS with reduced density in time-domain in the context of new carrier types. The L3 filter reset can also be triggered in any other useful manner, such as using other signals or state information. This trigger can also be used to reset interference per subband covariance matrix estimation for CQI reporting, Pre-Coding Matrix Indicator reporting, Rank Indicator reporting, or other reporting.

According to a second possible example embodiment of connected-mode RLM, if a user equipment is connected to a macro cell or a small cell in an on state, interference from a newly active neighbor small cell is large, and the current link can no longer be maintained, the user equipment can detect a Radio-Link Problem ("RLP") and may go into Radio-Link Failure ("RLF"). The minimum interruption due to RLP, RLF, or RLR may be roughly 200 ms ("Teval with N310=1")+50 ms=250 ms when T310=0. A typical interruption may also be of the order of 1 s due to a non-zero T310 timer. If a user equipment autonomously detects that a small cell in an off state has become active, then the shortest measurement time interval can be 200 ms when the L3 filter is disabled.

According to a possible first option implementation, a user equipment can determine if a neighbor cell has gone from off to on using a status indication change in a discovery signal, such as an SCDS. For example, a Gold sequence can be used as the signal sequence for an SCDS pilot portion. A Gold sequence can be a sequence that has good correlation properties with respect to auto-correlation and cross-correlation and can be used for generating reference signals in wireless systems. There can be one bit in the Gold sequence initialization that can encode whether the transmitting small cell is on or off. Alternately, a SCDS can have an embedded codeword determined by a bit-field that indicates whether the small cell is on or off. With the first option for determining if a neighbor cell has gone from off to on, the neighbor-cell off-to-on event can be detected by the user equipment using different methods.

According to one possible method for the first option, if a user equipment determines a number of consecutive detected Qout exceeds a N310 threshold and a newly active cell RSRP>serving-cell RSRP+threshold, such as an A3 event, then the user equipment attempts RRC connection establishment with a newly active cell bypassing the RLF mechanism. For example, when the user equipment 110 is in connected mode and within a cell tracking area, the user equipment 110 operates in the connected mode with a serving cell. The user equipment 110 determines that the serving-cell RSRP is less than a neighbor-cell RSRP plus a threshold. The user equipment 110 determines that the neighbor cell is off. The user equipment 110 sends a random-access channel transmission to wake up the neighbor cell. The user equipment 110 receives a physical broadcast channel transmission, such as a PBCH/SI-x transmission, in response to sending the random-access channel transmission. The user equipment 110 reselects to the neighbor cell in response to receiving the physical broadcast channel transmission.

According to another possible method for the first option, if the user equipment determines a number of consecutive detected Qout exceeds a N310 threshold, the user equipment detects the neighbor cell with RSRP>serving-cell RSRP+threshold, and the user equipment determines that a neighbor cell went from off to on based on user equipment detection of a SCDS status indication, such as when a SCDS has a one-bit encoding to indicate whether the cell is off or on, then the user equipment attempts RRC connection establishment with a newly active cell and bypasses the RLF mechanism. For example, the user equipment bypasses the RLF mechanism by continuing to evaluate Qout/Qin and by suspending triggering a T310 timer, which halts the RLF process until the user equipment's RRC connection establishment to the newly active cell is accepted or rejected. If the RRC connection establishment is accepted, then the user equipment has found a new serving cell. If RRC connection establishment is rejected, then the user equipment can start the T310 timer and proceed with a legacy or other RLM mechanism. This can reduce service interruption due to RLF and due to small cells transitioning between on and off.

According to a possible second option implementation, a user equipment can determine if a neighbor cell has gone from off to on using network signals via RRC at the instant of, or within a range of time from, when a neighbor small cell in an off state may become active. This may require extra network signaling over RRC and backhaul. For example, if cell 131 is a serving cell for user equipment 110 and cells 132-135 are neighbor cells, the RAN can intimate all user equipment connected to cell 131 via RRC whenever any neighbor cell changes state. According to this approach, RANs can implement some rudimentary form of Automatic Neighbor Relation ("ANR"). For each user equipment, a Mobility Management Entity can know the proximal cells, such as cells 132-135, based on the user equipment's measurement reports. The RAN sends an RRC message to a given user equipment only if one of the cells in the set of currently dormant or off cells is going to become active or on at some time t+T0, or the RAN can otherwise send the RRC message to the given user equipment. Instead of a dedicated RRC, a broadcast-type RRC indication can be used to improve efficiency. This may be useful for networks that implement ANR. With an RRC broadcast, the message can be similar to a SI-x change notification, but only active user equipment may be required to decode the message. This can result in smaller overhead and fixed transmission attempts, such as without Hybrid Automatic Repeat Request feedback.

According to one possible method for the second option, if the user equipment detects that a number of consecutive Qout exceeds N310 threshold, and the user equipment detects the neighbor cell with RSRP>serving-cell RSRP+threshold, and the user equipment receives an RRC signal indicating that neighbor cell went from off to on, then the user equipment attempts RRC connection establishment with the newly active cell and bypasses the RLF mechanism.

With either option for determining if a neighbor cell has gone from off to on, the user equipment can simultaneously track Qout and the newly active cell's RSRP and can attempt RRC connection establishment with the newly active cell if it is a suitable candidate.

According to another possible option implementation, user equipment can determine if a neighbor cell has gone from off to on by receiving a neighbor-cell list transmitted by each cell. The neighbor-cell list can include an on/off status for each neighbor cell in the list. For example, a serving cell, such as cell 131, can include on/off state information of neighbor cells 132-134 in a transmitted neighbor-cell list. If the neighbor-cell list indicates that cell 133 is dormant, then the user equipment 110 can assume it will be dormant for a next modification period. If the list is updated and indicates cell 133 will be active in a next modification period, then the user equipment 110 can prepare accordingly. The measurement object can be updated every time a cell in the list goes from on to off and off to on.

Intervention to legacy RLF procedures can be used when the user equipment has active time delay-sensitive traffic, such as Voice over Internet Protocol, video conferencing, gaming, and other time-sensitive traffic. If the traffic is not delay sensitive or if the user equipment is in DRX connected mode, such intervention may not be necessary.

According to a third possible example embodiment of connected-mode RLM, a small cell SCDS can have a Synchronization signal, such as a PSS/SSS, an RS, such as based on CRS/DMRS/Positioning Reference Signal/CSI-RS, or other reference signal. If there is an RS, such as for wideband, it can form the basis for radio-link monitoring by estimating the channel state for determining hypothetical BLER corresponding to PDCCH/EPDCCH DCI 1A/1C formats. Another possible approach for RLM can include the user equipment using RSRQ compared to a threshold as a signal-to-noise ratio ("SNR") measure for Qout/Qin. Yet another possible approach for RLM can include the user equipment using an estimated BLER based on decoding the corresponding codeword to detect Qout/Qin if the dormant cell transmits a payload, such as a dormant-PBCH or a dormant SI with CRC, in conjunction with SCDS. For the above two approaches, since the signal for RLM measurement, such as SCDS or D-PBCH, may be concentrated in a few occasions, such as in one subframe out of every 100 subframes, the user equipment can measure and average interference by taking more samples, such as by oversampling N times within one SCDS period, to get a more accurate estimate of the prevailing SNR conditions.

Figure 2:
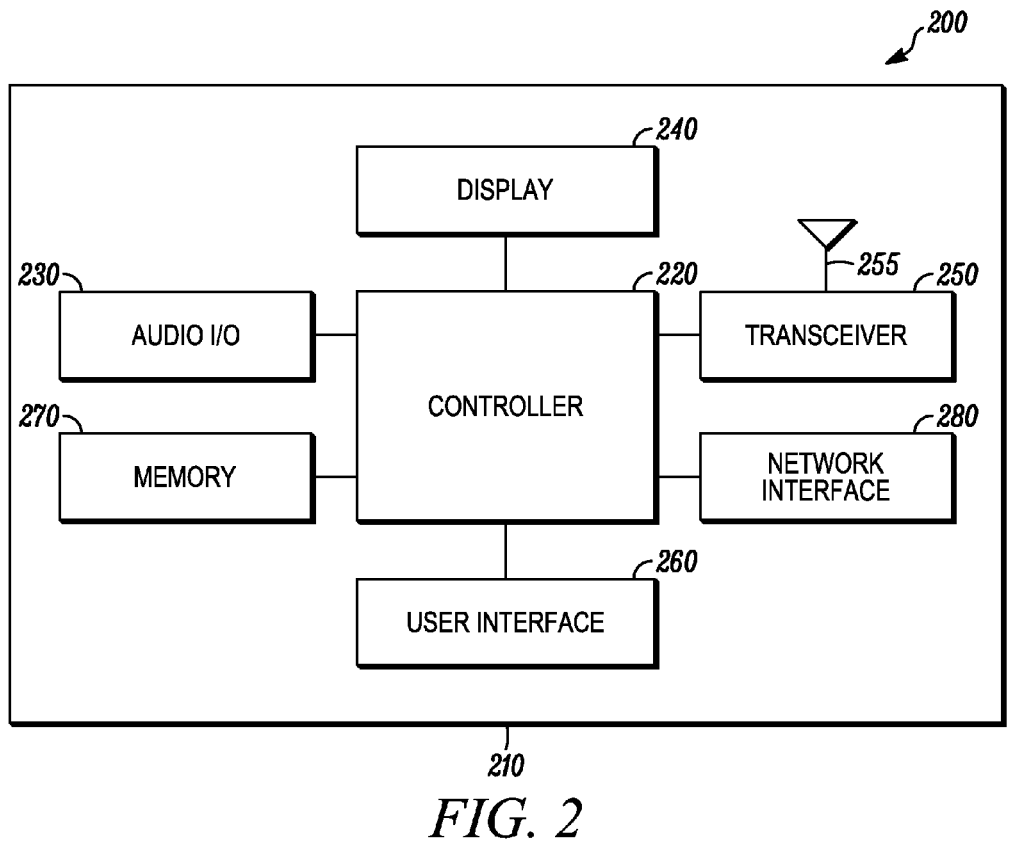
FIG. 2 is a schematic of an apparatus according to a possible embodiment.

FIG. 2 is an example block diagram of an apparatus 200, such as the user equipment 110, according to a possible embodiment. The apparatus 200 includes a housing 210, a controller 220 within the housing 210, audio input and output circuitry 230 coupled to the controller 220, a display 240 coupled to the controller 220, a transceiver 250 coupled to the controller 220, an antenna 255 coupled to the transceiver 250, a user interface 260 coupled to the controller 220, a memory 270 coupled to the controller 220, and a network interface 280 coupled to the controller 220. The apparatus 200 can perform the methods described in all the embodiments.

The display 240 can be a liquid-crystal display, a light-emitting diode display, a plasma display, a projection display, a touch screen, or any other device that displays information. The audio input and output circuitry 230 can include a microphone, a speaker, a transducer, or any other audio input and output circuitry. The user interface 260 can include a keypad, a keyboard, buttons, a touch pad, a joystick, a touch-screen display, another additional display, or any other device useful for providing an interface between a user and an electronic device.

The transceiver 250 may include a transmitter and a receiver. The network interface 280 can be a Universal Serial Bus port, an Ethernet port, an infrared transmitter/receiver, an Institute of Electrical and Electronics Engineers ("IEEE") 1394 port, an IEEE 802.15.1 interface, or any other interface that can connect an apparatus to a network, a computer, or other device and that can transmit and receive data signals. The memory 270 can include a random-access memory, a read-only memory, an optical memory, a subscriber-identity module memory, a flash memory, a removable memory, a hard drive, a cache, or any other memory that can be coupled to user equipment.

The apparatus 200 or the controller 220 may implement any operating system. The software and the operating system may be stored in the memory 270 or elsewhere on the apparatus 200. The apparatus 200 or the controller 220 may also use hardware to implement operations. For example, the controller 220 may be any programmable processor. Disclosed embodiments may be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. A processor may also include multiple processing elements. In general, the controller 220 may be any processor device capable of operating an electronic device and implementing the disclosed embodiments.

In operation, the transceiver 250 sends and receives communication signals. The processor 220 operates the apparatus 200 in a connected mode with a serving cell. The processor 220 determines a transition of a neighbor cell from dormant to active. For example, the processor 220 determines that a neighbor cell transitioned from dormant to active based on a received cell-discovery signal. As another example, the processor 220 determines the transition of a neighbor cell from dormant to active by receiving an RRC message from the serving cell indicating that a neighbor cell is transitioning from dormant to active within a time window. As a further example, the transceiver 250 receives a neighbor-cell list including a dormant/active status of at least one neighbor cell, and the processor 220 determines the transition of the neighbor cell from dormant to active based on the status of the neighbor cell in the neighbor-cell list.

The processor 220 detects that at least a set number of out-of-synchronization events, such as a N310 number of Qout events, has occurred with respect to the serving cell. For example, the processor 220 detects that at least a set number of out-of-synchronization events with respect to the serving cell has exceeded an N310 threshold. The processor 220 starts a T310 timer in response to detecting at least the set number of out-of-synchronization events, where the T310 timer indicates a time for the user equipment to synchronize with the serving cell. The processor 220 determines the transition of a neighbor cell from dormant to active prior to an expiration of the T310 timer.

The processor 220 determines that the neighbor-cell RSRP is greater than the serving-cell reference-signal received power plus a threshold after determining the transition of the neighbor cell from dormant to active. The processor 220 suspends the T310 timer when the neighbor-cell reference-signal received power is greater than the serving-cell reference-signal received power plus a threshold.

The processor 220 can send an RRC connection-establishment message to the neighbor cell when the neighbor-cell reference-signal received power is greater than the serving-cell reference-signal received power plus a threshold, when at least the set number of out-of-synchronization events has occurred with respect to the serving cell, and when the neighbor cell has transitioned from dormant to active. The processor 220 sends the RRC connection-establishment message to the neighbor cell prior to expiration of the T310 timer when the neighbor-cell reference-signal received power is greater than the serving-cell reference-signal received power plus a threshold. The processor 220 receives a signal indicating that the RRC connection was rejected and can restart the T310 timer if the RRC connection was rejected. The processor 220 connects to the neighbor cell if the RRC connection is accepted.

According to another possible embodiment, the processor 220 operates the apparatus 200 in a connected mode with a serving cell. The processor 220 receives a first RLM configuration applicable to a serving cell in an on state. The processor 220 receives a second RLM configuration applicable to a serving cell in an off state. The processor 220 identifies the state of the serving cell based on at least a first signal from the serving cell. The processor 220 monitors for at least one of Qout and Qin events based on at least one of the first and second RLM configurations and based on the identified state of the serving cell. An RLM configuration may include information for reference scheduling grants/control channels used for determining in-synchronization and out-of-synchronization events, information for timers associated with the in-synchronization and out-of-synchronization events, information for counters for in-synchronization and out-of-synchronization events, and other radio-link monitoring configurations.

Figure 3:
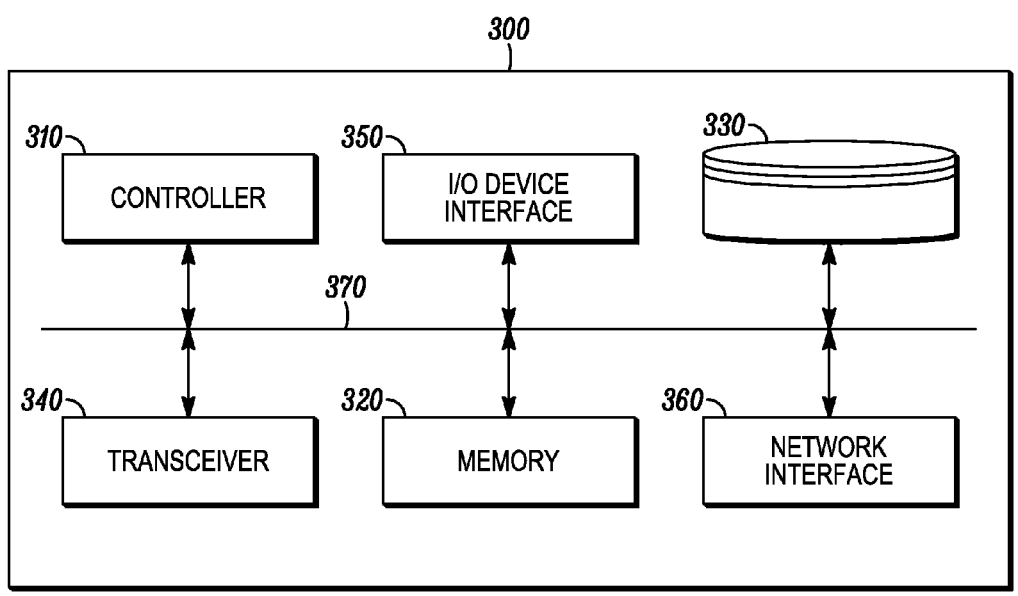
FIG. 3 is a schematic of a network controller according to a possible embodiment.

FIG. 3 is an example block diagram of a network controller 300, according to a possible embodiment. The network controller 300 can be located at a base station. The network controller 300 includes a controller 310, a memory 320, a database interface 330, a transceiver 340, Input/Output ("I/O") device interface 350, a network interface 360, and a bus 370. The network controller 300 may implement any operating system. The software and the operating system may be stored in the memory 320 or elsewhere on the network controller 300. The network controller 300 or the controller 310 may also use hardware to implement operations. For example, the controller 310 may be any programmable processor. Disclosed embodiments may be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or other devices that can implement the disclosed embodiments.

Figure 4:
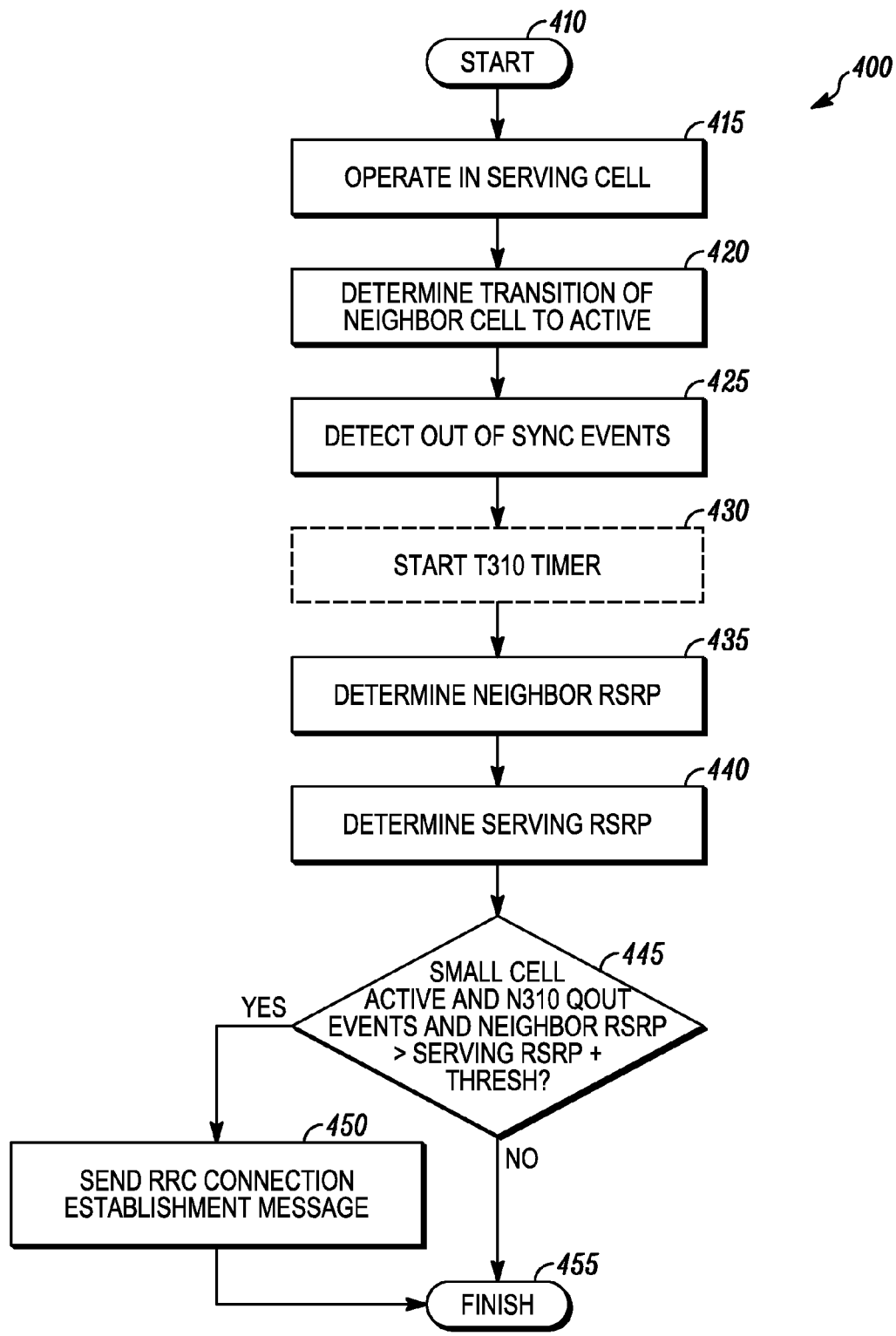
FIG. 4 is a flowchart illustrating the operation of an apparatus according to a possible embodiment.

FIG. 4 is an example flowchart 400 illustrating the operation of the user equipment 110 according to a possible embodiment. At 410, the flowchart 400 begins. At 415, the user equipment 110 operates in a connected mode with a serving cell. The serving cell can be a macro cell or a small cell.

At 420, the user equipment 110 determine a transition of a neighbor cell from dormant to active. The neighbor cell can be a macro cell or a small cell. The user equipment 110 determines the transition of the neighbor cell from dormant to active at any point of the flowchart 400 up until the decision at 445. The user equipment 110 can determine that a neighbor cell transitioned from dormant to active based on a received cell-discovery signal. The received cell-discovery signal can be a pilot signal, a reference signal, a small cell-discovery signal, a synchronization signal, or any other signal that can indicate that a neighbor cell transitioned from dormant to active. The user equipment 110 can also determine the transition by receiving an RRC message from the serving cell indicating that the neighbor cell is transitioning from dormant to active within a time window. The time window can include a period of time including a time of reception or transmission of the indication of the neighbor cell transition, can include a period of time up until the time of reception or transmission of the indication of neighbor-cell transition, can include a period of time after the time of reception or transmission of the indication of neighbor-cell transition, or can include any other useful period of time. The user equipment 110 can additionally determine the transition of a neighbor cell from dormant to active by receiving a neighbor-cell list including a dormant/active status of at least one neighbor cell and determining the transition of the neighbor cell from dormant to active based on the status of the neighbor cell in the neighbor-cell list. According to a possible embodiment a given cell can include dormant/active state information in its neighbor list, such as when the neighbor list says a given cell is dormant, and the user equipment 110 assumes the given cell will be dormant for the next modification period based on the state information. If the list is updated and indicates that the given cell will be active in next modification period, then the user equipment 110 can prepare accordingly. The measurement object can be updated every time a cell in the list goes from dormant to active.

At 425, the user equipment 110 detects at least a set number of out-of-synchronization events with respect to the serving cell. For example, the user equipment 110 determines that a number of out-of-synchronization events with respect to the serving cell has exceeded a N310 threshold. Detecting at least a set number of out-of-synchronization events can also include determining a number of out-of-synchronization events with respect to the serving cell has exceeded a N310 threshold.

At 430, the user equipment 110 optionally starts a T310 timer in response to detecting at least the set number of out-of-synchronization events. The T310 timer indicates a time for the user equipment 110 to synchronize with the serving cell. According to a possible embodiment, the user equipment 110 determines the transition of a neighbor cell from dormant to active prior to an expiration of the T310 timer. For example, the user equipment 110 determines the transition of the neighbor cell from dormant to active before the T310 timer starts running or while the T310 timer is running.

At 435, the user equipment 110 determines a neighbor-cell RSRP, such as by measuring the neighbor-cell RSRP. At 440, the user equipment 110 determines a serving-cell RSRP, such as by measuring the serving-cell RSRP. At 445, the user equipment 110 determines whether the neighbor-cell RSRP is greater than the serving-cell RSRP plus a threshold, whether at least the set number of out-of-synchronization events has occurred with respect to the serving cell, and whether the neighbor cell has transitioned from dormant to active.

If the condition at 445 is true, then at 450 the user equipment 110 sends an RRC connection-establishment message to the neighbor cell. The RRC connection-establishment message can be sent to the neighbor cell prior to expiration of the T310 timer. Furthermore, the T310 timer can be suspended when the condition at 445 is true. Suspending the T310 timer can include pausing, stopping, or resetting the T310 timer. Additionally, the user equipment 110 can restart the T310 timer if the RRC connection was rejected and can continue a radio-link problem procedure, such as a radio-link failure procedure.

If the condition at 445 is false, then at 455 the flowchart 400 ends. For example, the user equipment 110 can restart the T310 timer and can perform a radio-link problem procedure, such as a radio-link failure procedure, to determine whether the user equipment 110 has returned to an in synchronization condition with the serving cell, whether the user equipment 110 can reconnect to the serving cell, or whether the user equipment 110 should reselect to a neighbor cell.

Figure 5:
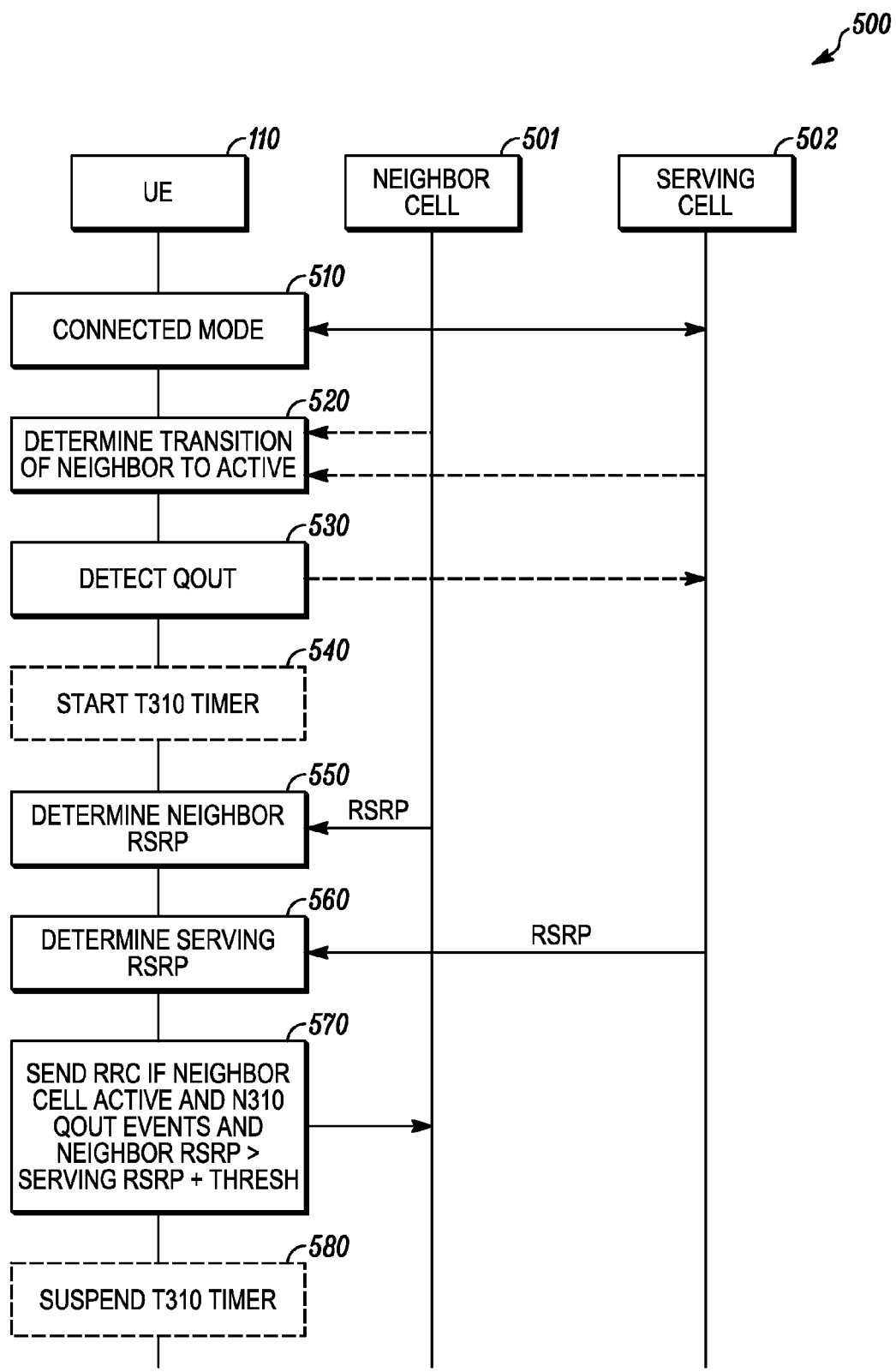
FIG. 5 is a signal-flow diagram according to a possible embodiment.

FIG. 5 is an example signal-flow diagram 500 illustrating the operation of the user equipment 110 with respect to a serving cell 502 and a neighbor cell 501, according to a possible embodiment. At 510, the user equipment 110 operates in a connected mode with the serving cell 502. At 520, the user equipment 110 determines a transition of the neighbor cell 501 from dormant to active. The user equipment 110 can determine the transition at any point in the signal-flow diagram 500 up until sending a RRC at 570. At 530, the user equipment 110 detects at least a set number of out-of-synchronization events with respect to the serving cell 502. At 540, the user equipment 110 optionally starts a T310 timer. At 550, the user equipment 110 determines an RSRP of the neighbor cell 501. At 560, the user equipment 110 determines an RSRP of the serving cell 502. At 570, the user equipment 110 sends an RRC connection-establishment message to the neighbor cell 501 when the neighbor cell 501 RSRP is greater than the serving-cell RSRP plus a threshold, when at least the set number of out-of-synchronization events has occurred with respect to the serving cell 502, and when the neighbor cell 501 has transitioned from dormant to active. At 580, the user equipment 110 suspends the T310 timer while attempting to connect to the neighbor cell 501.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:
1. A method in user equipment, the method comprising:
operating the user equipment in a connected mode with a serving cell;
determining a transition of a neighbor cell from dormant to active;
detecting at least a set number of out-of-synchronization events with respect to the serving cell;
determining that the neighbor-cell reference-signal received power is greater than the serving-cell reference-signal received power plus a threshold after determining the transition of the neighbor cell from dormant to active; and
sending a radio-resource-control connection-establishment message to the neighbor cell when the neighbor-cell reference-signal received power is greater than the serving-cell reference-signal received power plus a threshold, when at least the set number of out-of-synchronization events has occurred with respect to the serving cell, and when the neighbor cell has transitioned from dormant to active,
further comprising:
starting a T310 timer in response to detecting at least the set number of out-of-synchronization events, where the T310 timer indicates a time for the user equipment to synchronize with the serving cell;
wherein sending a radio-resource-control connection-establishment message includes sending the radio-resource-control connection-establishment message to the neighbor cell prior to expiration of the T310 timer,
further comprising suspending the T310 timer when the neighbor-cell reference-signal received power is greater than the serving-cell reference-signal received power plus a threshold,
further comprising:
receiving a signal indicating the radio-resource-control connection was rejected; and
restarting the T310 timer if the radio-resource-control connection was rejected.
2. An apparatus comprising:
a transceiver; and
a processor operatively coupled to the transceiver, the processor configured:
to operate the apparatus in a connected mode with a serving cell;
to determine a transition of a neighbor cell from dormant to active;
to detect that at least a set number of out-of-synchronization events has occurred with respect to the serving cell;
to determine that the neighbor-cell reference-signal received power is greater than the serving-cell refer- ence-signal received power plus a threshold after determining the transition of the neighbor cell from dormant to active; and to send a radio-resource-control connection-establishment message to the neighbor cell when the neighbor-cell reference-signal received power is greater than the serving-cell reference-signal received power plus a threshold, when at least the set number of out-of-synchronization events has occurred with respect to the serving cell, and when the neighbor cell has transitioned from dormant to active, wherein the processor is configured to start a T310 timer in response to detecting at least the set number of out-of-synchronization events, where the T310 timer indicates a time for the user equipment to synchronize with the serving cell; and wherein the processor is configured to send a radio-resource-control connection-establishment message by sending a radio-resource-control connection-establishment message to the neighbor cell prior to expiration of the T310 timer, wherein the processor is configured to suspend the T310 timer when the neighbor-cell reference-signal received power is greater than the serving-cell reference-signal received power plus a threshold, wherein the processor is configured to receive a signal indicating the radio-resource-control connection was rejected; and wherein the processor is configured to restart the T310 timer if the radio-resource-control connection was rejected.

3. A method in user equipment, the method comprising:

operating the user equipment in a connected mode with a serving cell;

determining a transition of a neighbor cell from dormant to active;

detecting that a number of out-of-synchronization events with respect to the serving cell has exceeded a N310 value;

starting a T310 timer in response to detecting at least the set number of out-of-synchronization events, where the T310 timer indicates a time for the user equipment to synchronize with the serving cell;

determining that the neighbor-cell reference-signal received power is greater than the serving-cell reference-signal received power plus a threshold after determining the transition of the neighbor cell from dormant to active and after detecting at least a set number of out-of-synchronization events with respect to the serving cell; and sending a radio-resource-control connection-establishment message to the neighbor cell prior to expiration of the T310 timer when the neighbor-cell reference-signal received power is greater than the serving-cell reference-signal received power plus a threshold, when at least the set number of out-of-synchronization events has occurred with respect to the serving cell, and when the neighbor cell has transitioned from dormant to active.

\* \* \* \* \*